No. 772,995.

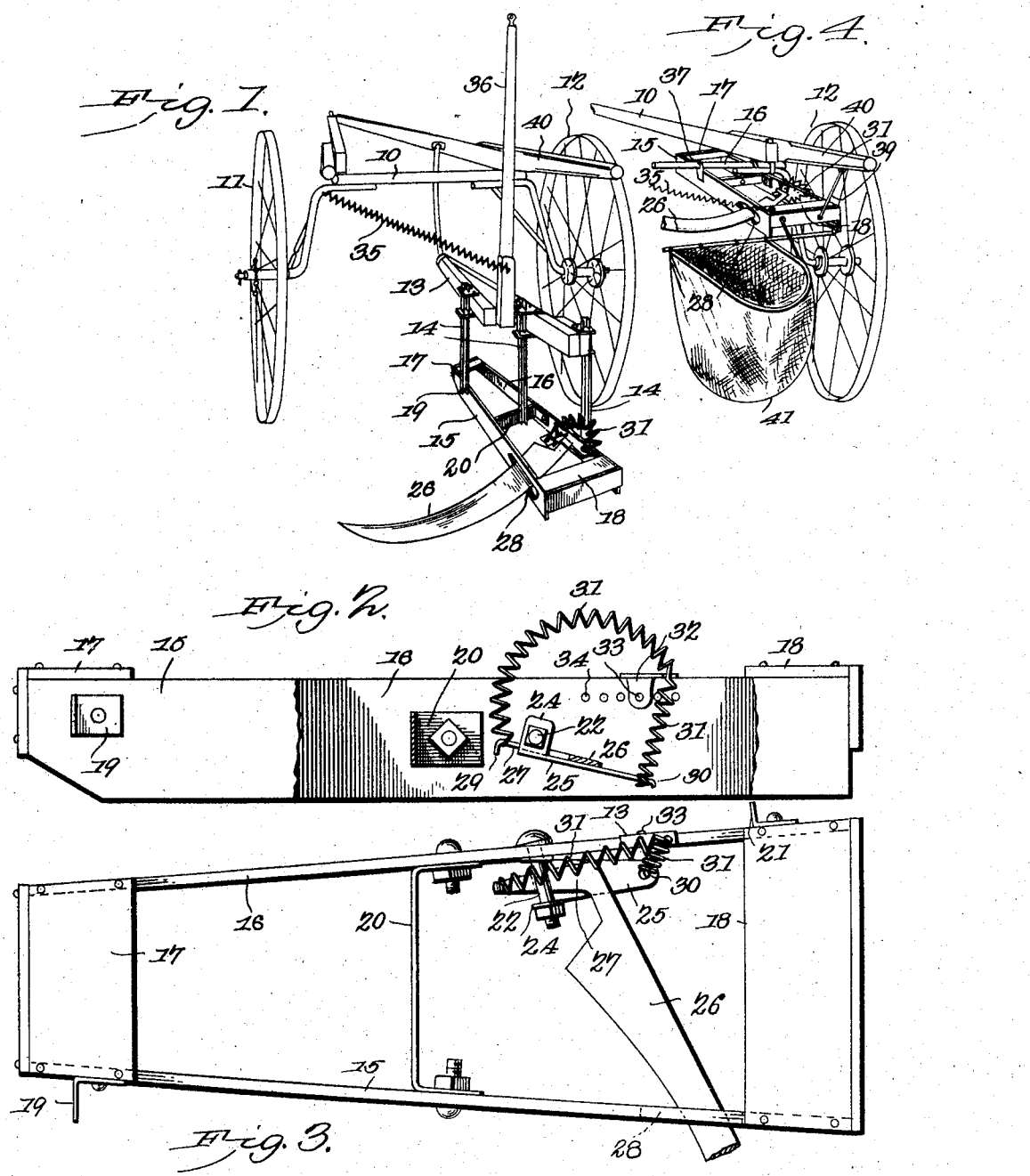

Patented October 25, 1904.

UNITED STATES PATENT OFFICE.

WALTON P. ALLGOOD, OF DEVINE, TEXAS, ASSIGNOR OF ONE-HALF TO JOSEPH P. ALLGOOD, OF PIEDMONT, ALABAMA.

CULTIVATOR ATTACHMENT.

SPECIFICATION forming part of Letters Patent No. 772,995, dated October 25, 1904.

Application filed June 10, 1904. Serial No. 211,967. (No model.)

*To all whom it may concern:*

Be it known that I, WALTON P. ALLGOOD, a citizen of the United States, residing at Devine, in the county of Medina and State of Texas, have invented a new and useful Cultivator Attachment, of which the following is a specification.

This invention relates to devices for cutting cotton-stalks, cornstalks, and the like, and has for its object to provide a simply-constructed and easily applied device for attachment to the framework of cultivators and similar implements whereby the framework and adjusting mechanism of the latter may be utilized to support and carry the stalk-cutting mechanism.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings, Figure 1 is a perspective view of a portion of a cultivator-frame with the improved attachment applied. Fig. 2 is a side elevation, enlarged and partially in section, of the improved device detached. Fig. 3 is a plan view of the same. Fig. 4 is a perspective view similar to Fig. 1 illustrating the manner of using the device for "topping" or trimming plants.

The improved device may be attached to any of the various forms of cultivators and similar implements manufactured by making slight and immaterial modifications in the coupling means, and for the purpose of illustration is shown applied to a conventional construction of this class of implements in which the axle 10, bearing-wheels 11 12, beams 13, and shovel-standards 14 are shown in the usual relative positions.

The improved device consists of a supporting-frame formed of spaced diverging side members 15 16, connected at front and rear by transverse connecting-bars 17 18 and provided with means—such as clips 19, 20, and 21—for detachable coupling to the shovel-standards, the shovels having first been removed when it is desired to operate close to the ground, and with modified coupling means, to be hereinafter described, for coupling directly to the axle when the device is to be operated at a greater distance from the ground for topping growing plants, as hereinafter explained.

Extending inwardly from the side member 16 is a stud 22, and swinging upon this stud by lateral ears, as 24, is a bracket or hanger 25, the ears being located at one end of the hanger. The cutting-blade 26 is provided with a lateral arm 27 for resting upon the hanger 25 and extending beneath the stud 22, the blade projecting by the other end through an aperture 28 in the side member 15 and inclined rearwardly, as shown. The aperture 28 is enlarged at the rear end to permit a certain degree of vertical play to the cutting-blade, which will thus rock, with the hanger 25, upon the stud 22 as a center. The forward end of the arm 27 and the rear end of the hanger 25 terminate, respectively, in hooks 29 30 to receive the opposite ends of a coiled spring 31. Attached to the spring at an intermediate point is a clip 32 for engaging the member 16 and adjustable longitudinally of the same, as by a pin 33, adapted to enter one of a series of spaced apertures 34 in the member 16. By this means it will be obvious that the force of the spring will be exerted to hold the blade 26 yieldably in certain predetermined position, the portion connected to the free end of the hanger 25 drawing the same upward and the portion connected to the arm 27 doing the same for the blade. The blade is thus held in a level position, and the springs will be strong enough to hold the blade against movement under the ordinary cutting strains to which it will be subjected, but will yield to any abnormal strains to which it may be accidentally subjected, and thus avoid breaking the blade. It will be noted that by adjusting the clip 32 upon the member 16 the tension of the spring may be controlled when required.

To attach the device to a cultivator-frame, the left-hand set of the beams 13 are detached and the hoes removed from the standards 14 of the right-hand beams. The clips 19, 20, and 21 are then connected with the standards 14 and a spring 35, connected between the axle 10 near the left-hand wheel 11 and the rear portion of the beams 13, preferably to a standard 36 rising therefrom, to hold the cutting-blade and its frame up to the work, while at the same time with a sufficient degree of flexibility to yield under the abnormal strains, and thus prevent breakage. Then as the machine is driven forward the blade severs the stalks, as will be obvious, and yields to prevent breakage under abnormal strains, as before described.

The improved attachment may be constructed for left or right operation, as will be obvious, but will preferably be arranged for attachment to the right-hand beams 13.

The device when attached to the standards 14 will travel relatively close to the ground and will sever the stalks short off and when thus arranged is admirably adapted to the clearing of the ground of the stalks of cotton, corn, and the like remaining after the crops are gathered; but the device is also admirably adapted for use in topping certain kinds of plants under certain conditions and for certain purposes and when thus employed will be suspended from the axle 10 at the proper distance above the ground, as shown in Fig. 4, and to this end a suitable fastening means, such as a pair of clips 37, for attachment between the axle 10 and members 15 16 are provided, together with suspension-rods 39 for supporting the rear portion of the knife-carrying frame from the rearwardly-extending members 40 of the cultivator-frame. When employed in its elevated position, all the beams 13 and their standards 14 will be detached and the axle and carrier-wheels and draft-frame only employed. The spring 35 will be arranged in substantially the same manner in both forms of the attachment. When employed at the higher elevation, a receiving-bag 41 is suspended in the rear of the blade to receive the severed material.

Certain kinds of crops are liable to attack in the early stages of growth from injurious insects—such, for instance, as the boll weevil upon the cotton-plant—and this pest can be largely eradicated by cutting off the tops of the plants when first attacked, and the device herein described is especially adapted for this purpose when suspended from the axle at a relatively high point, as above described, and by retaining the severed tops containing the insects or their eggs in the receiving-bag 41 they can be easily destroyed as fast as gathered. The device is thus a very valuable one for the purposes described and may be employed for a number of purposes and provides a simple and inexpensive stalk-cutter attachment for connection to a machine already constructed, thus obviating the expense of a separate stalk-cutting machine. When employed for topping plants, the cutter-carrying frame may be adjusted to any desired height, together with the receiver 41, and may be arranged upon either side of the supporting-frame desired.

Having thus described my invention, what I claim is—

1. In a cutting attachment, a frame, a stud extending inwardly from one side of said frame, a hanger supported upon said stud, a blade supported upon said hanger and extending through a slot in the opposite side of the frame, a spring having its ends connected respectively with the heel end of the blade and with the hanger, and means for adjustably securing an intermediate portion of said spring with relation to the frame.

2. A device of the class described consisting of a frame having means for laterally-yieldable attachment to a cultivator or like implement and provided with a laterally-extending cutting-blade inclined rearwardly therefrom and connected thereto for vertically yielding under abnormal pressure.

3. A device of the class described consisting of a frame having means for laterally-swinging attachment to a cultivator or like implement and provided with a cutting-blade extending laterally and at a rearward inclination therefrom, and a spring between said frame and the cultivator-frame for holding the blade yieldably against the material to be severed.

4. An attachment for cultivators and similar implements consisting of a frame having spaced diverging sides and provided with means for detachable connection with the shovel-standards of the cultivator, and a cutting-blade connected by its heel end to one of said side members and extending in a rearwardly-inclined direction through an aperture in the other side member.

5. An attachment for cultivators and similar implements consisting of a frame having spaced diverging sides and provided with means for detachable connection with the shovel-standards of the cultivator and a cutting-blade flexibly connected by its heel end to one of said side members and extending in a rearwardly-inclined direction through an aperture in the other side member.

6. An attachment for cultivators and similar implements consisting of a frame having spaced diverging sides and provided with means for detachable connection with the shovel-standards of the cultivator, a stud supported in a substantially horizontal position in one of said side members, a cutting-blade connected for rotation relative to said stud and extending by its free end at a rearward inclination transversely of the other side member and a spring connected to yieldably maintain said blade in operative position.

7. An attachment for cultivators and similar implements consisting of a frame having spaced diverging sides and provided with means for detachable connection with the shovel-standards of the cultivator, a stud supported in a substantially horizontal position in one of said side members, a hanger having spaced lateral ears for rotative engagement with said stud, a cutting-blade having a laterally-projecting arm upon its heel end for resting on said hanger and extending beneath said stud, a spring connected by its ends, respectively to the free end of said arm and the free end of said hanger and a clip connected intermediately to said spring and adjustably coupled to the adjacent side member for regulating the tension of said spring.

8. An attachment for cultivators and similar implements consisting of a frame having spaced diverging side members and with clips extending laterally from the diagonally opposite ends of the same and with an intermediate clip between the side members, said clips for detachable connection to the shovel-standards of the cultivator or similar implement, a cutting-blade connected by its heel end to one of said side members and extending at a rearward inclination transversely of the other side member.

9. An attachment for cultivators and similar implements consisting of a frame having spaced diverging sides and provided with means for detachable connection with the shovel-standards of the cultivator, a cutting-blade connected by its heel end to one of said side members and extending in a rearwardly-inclined direction through an aperture in the other side member, and a spring between said frame and the cultivator and operating to hold the cutting-blade yieldably against the material to be severed.

In testimony that I claim the foregoing as my own I have hereto affixed my signature in the presence of two witnesses.

WALTON P. ALLGOOD.

Witnesses:
 A. B. WILLIAMSON,
 J. O. BLACKWELL.